United States Patent
Deutsch et al.

(10) Patent No.: US 12,248,905 B2
(45) Date of Patent: Mar. 11, 2025

(54) METHOD FOR ALLOCATING PARCELS AND A SYSTEM THEREFOR

(71) Applicant: Swipbox Development APS, Sonderborg (DK)

(72) Inventors: Miriam Bartholdy Deutsch, Sydals (DK); Allan Kaczmarek, Sønderborg (DK)

(73) Assignee: Swipbox Defelopment APS, Sonderborg (DK)

( * ) Notice: Subject to any disclaimer, the term of this patent is extended or adjusted under 35 U.S.C. 154(b) by 1132 days.

(21) Appl. No.: 16/971,290

(22) PCT Filed: Feb. 22, 2019

(86) PCT No.: PCT/DK2019/050068
§ 371 (c)(1),
(2) Date: Aug. 19, 2020

(87) PCT Pub. No.: WO2019/161870
PCT Pub. Date: Aug. 29, 2019

(65) Prior Publication Data
US 2021/0012279 A1    Jan. 14, 2021

(30) Foreign Application Priority Data
Feb. 23, 2018 (DK) .......................... PA 2018 70119

(51) Int. Cl.
*G06Q 10/0836*    (2023.01)
*G07C 9/00*    (2020.01)
*H04W 12/069*    (2021.01)

(52) U.S. Cl.
CPC ..... *G06Q 10/0836* (2013.01); *G07C 9/00571* (2013.01); *H04W 12/069* (2021.01)

(58) Field of Classification Search
CPC ............ G06Q 10/0836; H04W 12/069; G07C 9/00571
(Continued)

(56) References Cited

U.S. PATENT DOCUMENTS 6,392,993 B1 * 5/2002 Hamilton ................ H04L 47/12
714/748
11,600,125 B1 * 3/2023 Hapgood ............ H04W 12/041
(Continued)

FOREIGN PATENT DOCUMENTS

EP    3211575 A1    8/2017
EP    3671667 A1 *  6/2020 ........... G06F 16/285
(Continued)

OTHER PUBLICATIONS

"Understanding TCP Sequence and Acknowledgment Numbers". Published Jun. 7, 2010. https://packetlife.net/blog/2010/jun/7/understanding-tcp-sequence-acknowledgment-numbers/ (Year: 2010).*
(Continued)

*Primary Examiner* — George Chen
*Assistant Examiner* — Lisa Ma
(74) *Attorney, Agent, or Firm* — Schmeiser, Olsen & Watts, LLP

(57) ABSTRACT

Aspects of the present disclosure relate to methods and systems for parcel allocation. In one example embodiment, a system is disclosed including a server, one or more service points and a user application. In another example embodiment, a method for allocating parcels is disclosed including acts of communicating data to and from the server and the service point, comprising electronic tokens. In various embodiments, the communicated data to or from the service point and/or the server is received by and/or transmitted from a user application and a mobile smart device.

8 Claims, 6 Drawing Sheets

(58) Field of Classification Search
USPC .......................................................... 705/339
See application file for complete search history.

(56)           References Cited

U.S. PATENT DOCUMENTS

| | | |
|---|---|---|
| 2015/0356801 A1 | 12/2015 | Nitu et al. |
| 2016/0267738 A1* | 9/2016 | Carstens .................. E05C 9/08 |
| 2016/0275741 A1 | 9/2016 | Carstens et al. |
| 2016/0308962 A1* | 10/2016 | Hegde ................. H04L 67/1095 |
| 2017/0257841 A1 | 9/2017 | Skaaksrud |
| 2018/0350177 A1* | 12/2018 | Dautz .................. G06Q 20/327 |
| 2019/0102962 A1* | 4/2019 | Miller ................ G07C 9/00309 |
| 2019/0333304 A1* | 10/2019 | Flynn ................... G06Q 20/327 |
| 2023/0154260 A1* | 5/2023 | Osborn .................... G07C 9/22 |
| | | 340/5.61 |

FOREIGN PATENT DOCUMENTS

| | | |
|---|---|---|
| GB | 2483474 A | 3/2012 |
| WO | 2017163018 A2 | 9/2017 |
| WO | 2018185772 A1 | 4/2018 |

OTHER PUBLICATIONS

Che-Jung Hsu, Huey-Ing Liu, and Winston Seah. Economy: a duplicate free Opportunistic Routing. https://doi.org/10.1145/1710035.1710052 (Year: 2009).*

* cited by examiner

METHOD FOR ALLOCATING PARCELS AND A SYSTEM THEREFOR

CROSS-REFERENCE TO RELATED APPLICATIONS

This application is a national stage filing based upon International PCT Application No. PCT/DK2019/050068, filed 22 Feb. 2019, which claims the benefit of priority to Denmark application No. PA 2018 70119, filed 23 Feb. 2018.

FIELD OF THE INVENTION

The present invention relates to a method and a system for allocation of parcels. The system comprises a server, one or more service points and a user application. The method for allocating parcels comprises acts of communicating data to and from the server and the service point, comprising electronic tokens. A method and a system wherein the communicated data to or from the service point and/or the server is received by and/or transmitted from a user application and the use of a mobile smart device hereto.

BACKGROUND OF THE INVENTION

The distribution and allocation of parcels typically involves multiple partners in the process from the time the consignor or consignee/receiver of the parcel orders a parcel delivery until the consignee receives the parcel. The involved partners may include multiple couriers, postal or logistics providers. In addition; the process may include multiple acts of handling the parcel. This may include acts of transporting, receiving, delivering or handing out the parcel, and storing the parcel.

In general, the distribution and allocation of parcels is continuously being optimized to include lower storage time and less manual handling.

Especially the distribution and allocation of parcels on an ad hoc basis, where the consignor and consignee do not have regular or large shipments, e.g. weekly or daily delivery of large shipments from company to company, is generally changing to include an assigned pick-up place or service point, where the consignee can pick up the parcel within a given time interval.

The number of serviced postal offices for handing out parcels is decreasing and the serviced postal offices are being replaced by self-service parcel lockers. The self-service parcel lockers may have a lower storage capacity than the postal offices but may be distributed more broadly to generate more delivery and/or pick-up places.

Today, parcel lockers typically communicate directly with a server using systems for mobile telecommunication, such as GSM, UTMS or comparable systems. The systems may use WLAN, wireless access points or hard-wired connections to the internet. Furthermore, the parcel lockers today typically comprise a display and an input unit, which may be a key pad, a scanner or a touch screen to display information and/or guide the user of the delivery or pick-up event, which often includes entering a code for the parcel delivery or parcel pick-up event.

The operation of the parcel lockers is dependent on a continuous and stable operated mobile telecommunication system and/or internet connection, and thus, the location of the parcel lockers should be chosen accordingly.

Furthermore, the parcel lockers are typically installed with a hard-wired power connection to provide sufficient power to the operation of the parcel locker, to power the display and/or the input units, as well as the data communication. This further incites the user to choose the location of the parcel lockers accordingly. Furthermore, as the parcel lockers are typically electronically operated, a continuous and stable power supply is required.

This may present obstacles in regard to achieving an even and fine distribution mesh of parcel lockers, where the parcel lockers can be placed as freely as possible in any location and in a fast yet reliable manner, even though there may exist unstable infrastructure with poor mobile telecommunication systems, internet connections and/or unstable power supply.

EP 3211575 discloses a method for operating parcel lockers and an associated system using mobile units to communicate with parcel lockers and an external server, respectively. The communication between a parcel locker and a mobile unit can be through Bluetooth or similar connections. A specific compartment in the parcel locker is opened by an ID match between the mobile unit and the parcel locker. A pickup/delivery report is sent to the mobile unit, which can later be forwarded to an external server.

D1 discloses a system where the parcel locker is independent of a power supply network, and a system with a one-to-one communication between the parcel locker and the mobile unit.

US 2017/0257841 discloses a method and applicable devices for achieving a current status of storage systems. The method can be used for wireless networks consisting of several nodes (units) and mobile devices are used to create a communication bridge between a storage system and an external server or other devices. It is described how a status update can be sent in a communication from a mobile device to the external server such that the server has an updated status of the storage system.

OBJECT OF THE INVENTION

It is an objective to overcome one or more of the before mentioned shortcomings of the prior art.

DESCRIPTION OF THE INVENTION

An object of the invention may be achieved by use of a mobile smart device installed with a user application in a system comprising a server and one or more service points for transmitting electronic tokens between the server and a service point. A use which includes using a communication standard for a data transmission supporting mobile communication system for communicating the electronic tokens to the server, and using a communication standard of a wireless personal area network for communicating the electronic tokens to the service point, such that the user application acts as a signal transformer for the electronic tokens being piggybacked by the user application between the server and the service point, which use is for a parcel allocation system.

The mobile smart device installed with the user application may be one out of a distributed network of mobile smart devices installed with the user application.

The electronic tokens may include user electronic tokens, synchronization electronic tokens and/or acknowledgement electronic tokens.

Each user electronic token may be piggybacked by a single user application installed on a specific mobile smart device of the distributed network of mobile smart devices installed with the user application.

For each user electronic token, one or more synchronization electronic tokens and/or acknowledgement electronic tokens may be piggybacked by one or more user applications of the distributed network of mobile smart devices.

The multiple synchronization electronic tokens and/or acknowledgement electronic tokens for each user electronic token may be identical copies. Hence the multiple synchronization electronic tokens may be identical and the acknowledgement electronic tokens may be identical.

The method may be referred to that the user electronic token is piggybacked between the server and the service point in a point-to-point connection using a preferred path whereas the synchronization and acknowledgement tokens may be piggybacked between the server and the service point in a point-to-point connection using distributed paths laid out by the distributed network of mobile smart devices installed with the user application.

The piggybacking of the synchronization and acknowledgement tokens may be comparable to 'Round Robin'-distribution versus 'preferred path'-distribution of the user electronic tokens, however without using a determined order, but instead using a 'preferred path' for the user e-token and one or more 'arbitrary paths' for the synchronization and acknowledgement tokens.

User application is used for an application program adapted to be installed and executed by a smart device.

In the following, electronic token may be referred to as e-token.

One effect of this use is that the service point may eliminate any communication directly to the server and only communicates to a mobile smart device in the close vicinity hereof. This may be advantageous in regard to eliminating the need for internet coverage at the location of the service point.

For wireless personal area networks (WPAN), especially two kinds of wireless technologies are used today: Bluetooth and near field communication (NFC). A key concept in WPAN technology is the concept of plugging in, which may ensure that, when any two WPAN-equipped devices come into close proximity (within several metres of each other), they may communicate as if connected by a cable. Another important feature is the ability of each device to lock out other devices selectively, preventing needless interference or unauthorized access to information.

Especially the Bluetooth standard may transfer data relatively fast with low power consumption. In addition, the quiescent current is very low. Furthermore, a Bluetooth communication unit is a very common unit in mobile smart devices, where the unit may have a communication range from a few meters and beyond. Other communication standards for WPAN with the same characteristics of low power consumption and a limited communication range may be used. Furthermore, the communication standard may generally be widely used and implemented in mobile smart devices. This has the advantage of easy access to implementation and use of the method.

Thus, a further effect of the use, using a WPAN connection, may be that the communication between the user application/mobile smart device and the service point is low power consuming communication, this being advantageous in regard to reducing the power consumption by the service point. As the mobile smart device is used 'on the go', the use of a WPAN connection may also be an advantage as it entails low power consumption by the mobile smart device.

A further effect of the embodiment may be that the mobile smart devices do not access the content of the e-tokens but only carries or piggybacks the e-tokens, which may be advantageous both in regard to the robustness of the parcel allocation system and the mobile smart device.

A robust system may refer to a system with a high security against hacking. A robust system may also refer to a system with a high level of redundancy.

The embodiment may have yet a further effect of achieving a real-time communication with the service point through a third party's mobile smart device installed with the user application. This may for example be relevant if a courier, a maintenance professional, a consignee, a consignor or another party requires help or guidance from a support employee. The support employee may then in real-time communicate with the service point by transmitting and/or receiving e-tokens. A real-time communication requires that the mobile smart device to be used has data connection. The real-time communication may include tasks such as requiring a status log from a parcel locker, opening a door to a compartment of a parcel locker or comparable tasks. These are merely examples and should be read as such.

An object of the invention may be achieved by a method for allocating parcels, comprising acts performed in a service point having a service point ID and acts performed in a server. The acts performed in the service point having a service point ID may comprise transmitting beacon signals comprising a service point ID, and receiving a user e-token tagged with the service point ID and comprising a piece ID and instructions of a user event. Further acts performed in the service point may be generating a sequence number for the instructions of the user event, generating a synchronization e-token comprising the sequence number and the piece ID, and transmitting the synchronization e-token. The acts performed in the server may comprise creating a piece ID for a parcel, and allocating the parcel to a service point having a service point ID. Further acts performed in the server may comprise generating a user e-token tagged with the service point ID and comprising the piece ID and instructions of a user event and transmitting the user e-token. Yet a further act performed in the server may be receiving synchronization e-token(s) comprising a sequence number and a piece ID. Furthermore, the method comprises further acts performed in the server of generating and transmitting an acknowledgment e-token for acknowledgment of a received synchronization electronic token, and a further act performed in the service point of receiving the acknowledgment e-token, such that a handshake between the server and the service point is performed. A method wherein the e-tokens of said method are communicated between the service point and the server via a user application adapted to be installed on a mobile smart device comprising a processor and communication means.

In one embodiment of the method, the user electronic token is communicated between the service point and the server via a user application and the synchronization electronic token and the acknowledgement electronic token are communicated by any user application.

The sequence number may be a local identifier. The sequence number of the instructions may be sequentially numbered. Alternatively, the sequence numbers may be generated as sequential numbers for a single piece ID. Hence, the sequence number may be a local identifier for the parcel locker or for each piece ID. The acknowledgment e-token may comprise a value identifying or being associated with the parcel e.g. the piece ID and/or the sequence number to mention a few of the possible values to include in the acknowledgement e-token.

The service point ID and/or the piece ID may be global unique identifiers and the method may ensure a distributed architecture for the parcel allocation, where the server allocates the parcels to one or more service points, and each service point returns information about when a user e-token has been used and with sufficient information to provide for the service point status, such that the server may be informed of the current status of the one or more service points. This information may include instructions of a user event, such as a delivery or pick-up of a parcel to be performed by the holder of the user e-token.

Instruction of a user event refers to the instruction to be performed by the holder of the user e-token. This may be delivery of a parcel, pick-up of a parcel or other events which may be relevant.

One effect of this method is that the service point may eliminate any communication directly to the server and only communicate to a mobile smart device in close vicinity hereof. This may be advantageous in regard to eliminating the need for internet and/or mobile communication coverage at the location of the service point.

In one aspect, the user e-tokens may be transmitted to the holder of the user e-token using http data, https data or comparable protocols. Once the user e-token is transmitted and hence in the hands of the now holder of the user e-token, a notification may be sent from the user application informing the holder thereof. The user may only receive this notification once he/she holds the user e-token, thereby ensuring that the user e-token has actually been received by the holder. Additional information of the parcel and/or the location of the service point may be enclosed in the notification, in a separate message or an attached message to the user e-token but not comprised therein.

In one aspect, the user e-token may be used with a user application installed on the receiving mobile smart device. In another aspect, the user e-token may be further transmitted from one electronic device or electronic storage to a suitable mobile smart device with the user application installed. Hereby, it may be achieved that the user e-token may be transferred by the receiving part to a trusted person to pick up the parcel instead of the recipient himself.

A consequence of piggybacking may be that that a synchronization e-token to be communicated from the service point to the server via the user application may not reach the server at all or may reach the server long after the event has been performed. By sending an acknowledgement e-token, a verification of the received synchronization e-token may be achieved. Hence, a handshake for the received synchronization e-token is performed.

In one aspect, the server may store a copy of the user e-token until the handshake for the received synchronization e-token is performed.

In one embodiment of the method, an authentication may be performed between the service point and the user application. The authentication may be performed after the WPAN connection is established between the user application and the service point, but before transmittal of the user e-token to the service point.

The authentication may comprise transfer of a challenge from the user application to the service point, transfer of a challenge key from the service point to the user application and a subsequent act of comparing the challenge and the challenge key performed by the user application, which then if the challenge and the challenge key match automatically transmits the user e-token.

The sequence number may be used as the handshake parameter for verification from the server of receipt of the synchronization e-token. Furthermore, the sequence number in combination with the piece ID may be used for keeping track of the service point's capacity status.

The synchronization e-tokens may comprise multiple sequence numbers and associated piece IDs. Furthermore, the synchronization e-tokens may be resent until an acknowledgement e-token is received, thereby ensuring that the server receives sufficient information from each parcel locker to keep track of the service point capacity status, even if one or more synchronization e-tokens are lost.

In a further embodiment of the method, the e-tokens communicated between the server and the user application are communicated using a communication standard for a data transmission supporting mobile communication system, and the e-tokens communicated between the service point and the user application are communicated, using a communication standard of a wireless personal area network (WPAN), such that the user application acts as a signal transformer for the electronic tokens being piggybacked by the user application.

The user e-token which is adapted to be received by a service point using a WPAN may be tagged with the service point ID to ensure selective communication only with devices comprising user e-tokens with that service point ID to prevent unnecessary interference or unauthorized access to information.

The synchronization and the acknowledgement e-tokens may not be tagged with a service point ID. These may be transferred to/from a user application, which is connected through the WPAN to the service point. Hence, a synchronization and/or verification e-token may only be transmitted to user applications, which have gained access through a user e-token.

The transmitted beacon signal and the transmission from the service point to the user application may be a Bluetooth signal. The Bluetooth standard may transfer data relatively fast with low power consumption. Furthermore, the quiescent current is very low. A Bluetooth communication unit is a very common unit in mobile smart devices, where the unit may have a communication range from 10 meters and longer. Other communication standards with the same characteristics of low power consumption and a limited communication range may be used. Furthermore, the communication standard to be used may be widely used and implemented in mobile smart devices to achieve easy access to implement and use the method.

Hence, the user application may communicate with the service point by one communication standard and use another communication standard to communicate with the server. This may, as described, be advantageous in regard to using a communication standard with low power and short-reaching communication signals between the mobile smart device and the service point, and may use a communication standard between the mobile smart device and the server comprising high power and long-reaching communication signals.

The above may result in a method wherein the acts performed by the service point do not require any internet connection or connection to a mobile communication system but only a communication signal adapted to be received by a mobile smart device installed with the user application. Furthermore, the method may be performed as a low power consuming method as the transmitted signal may have a limited propagation distance.

Thus, one effect of the transmitted beacon signal comprising the service point ID may be that a user application carrying a user e-token tagged with a matching service point ID may establish a WPAN communication with the service point. This may have the further advantage that the generated and transmitted synchronization by the service point may be transmitted immediately to the user application. The user application may then transmit the synchronization e-token immediately or carry it until a proper mobile communication connection to the server may be established. Thus, the user application uses the mobile smart device for piggybacking the e-token from the service point to the server.

In one aspect, a further object of the invention may be achieved by the method wherein the user e-token(s) is encrypted with a service point encryption key associated with the service point of the comprised service point ID.

An effect of the further embodiment may be that the encryption key is not transmitted to and/or from the service point with the advantage of mitigating any risk of hacking the service point or the e-tokens. A further advantage is that in case one encryption key may be decoded, only one service point may be affected.

In another aspect, the method may comprise a further act of displaying information, which act is performed by the user application adapted to be installed on a mobile smart device comprising a processor and transmitter/receiver means.

A further effect of this method may be that any displaying of information may be performed by an external screen included in or connected to the mobile smart device, such that the method may display information but without requiring a service point with a display unit for performing the method. This may be advantageous in regard to omitting any costs for installing and maintaining such a display unit, but also in regard to achieving a method wherein the method acts performed by the service point(s) may keep the power consumption at a minimum.

In a further embodiment, the method comprises a further act performed in the service point with a service point ID, of creating a service point synchronization record entry comprising the sequence number and the piece ID, and a further act performed in the server, of creating a server synchronization record entry comprising the piece ID comprised in the received synchronization e-token(s), such that the server comprises a server synchronization record and the service point comprises a service point synchronization record, each comprising updated data of the service point, which records are synchronized with a performed handshake.

One effect of this embodiment with synchronization between the service point and the server of the parcels may be that the server is continuously updated on the status of each service point's capacity, thereby using the service points efficiently to achieve a high occupancy rate.

The present invention relates to different aspects. One aspect is the method described above; other aspects may include devices, user applications and systems each yielding one or more of the effects and advantages described above. One aspect may have embodiments corresponding to embodiments described for another aspect (method, use, device and user application).

An object of the invention may be achieved by a service point having a service point ID comprising service point receiver means, processor means and transmitter means. The service point receiver means may be configured to receive a user e-token tagged with a service point ID and comprising a piece ID and instructions of a user event. The service point processor means may be configured to create a service point command for the received instructions and transmit the created command signal for performing the service point command. The service point processor means may further be configured to generate a sequence number for the received instructions, and generate a synchronization e-token comprising the sequence number and the piece ID. The service point transmitter means may be configured to transmit beacon signals comprising the service point ID and to transmit generated synchronization e-tokens. Furthermore, the service point receiver means may be configured to receive an acknowledgment e-token, such that a handshake for a transmitted synchronization e-token is received, and the service point transmitter means and service point receiver means are configured to communicate the e-tokens to and/or from a user application adapted to be installed on a mobile smart device comprising a processor and communication means.

Instruction of a user event refers to the instruction to be performed by the holder of the user e-token. This may be delivery of a parcel, pick-up of a parcel or other events which may be relevant.

A service point command may, in the case of the service point being a parcel locker, be a command for unlocking a lock of a door to a parcel locker compartment.

As previously described, the method may provide for a distributed architecture for the parcel allocation, where the server allocates the parcels to one or more service points, and each service point returns information of when a user e-token has been used and with information to provide for the service point status, such that the server is informed of the current status of the one or more service points. This embodiment of the service point provides for a 'unit' to be used in such a distributed architecture, where the service point acts as a separate node where a user event, such as a delivery or pick-up of a parcel, may be performed.

The service point ID and/or the piece ID may be a global unique identifier.

One effect of this embodiment may be that the service point may only need to transmit beacon signals to advertise about its presence with a short propagation range. The beacon signals may be transmitted with a low repetition rate. This may be advantageous in regard to achieving low power consumption for advertising about its presence.

In line with the effects and advantages described in connection with the method for allocating parcels, one effect of this use is that the service point may eliminate any communication directly to the server and only communicate to a mobile smart device in the close vicinity hereof. This may be advantageous in regard to eliminating the need for internet and/or mobile communication coverage at the location of the service point.

As previously described, an effect of the embodiment is that the user application uses the mobile smart device for piggybacking the e-tokens between the service point and the server with the advantage of using a communication standard with low power and short-reaching communication signals between the mobile smart device and the service point. In addition, using the mobile smart device for piggybacking the e-token between the service point and the server, the service point does not require any internet connection but only needs a communication signal adapted to be received by a mobile smart device installed with the user application.

A further effect of the embodiment may be to ensure that each service point may keep track of performed instructions, thereby keeping its own track history. This information may further be transmitted to the server to be updated with any performed instructions, such that the server may be updated with each service points' current status. By sequentially numbering the performed instructions, it may be ensured that all events are actually received by the server.

The use of piggybacking may result in that a synchronization e-token, to be communicated from the service point to the server via the user application, may not reach the server at all or may reach the server long after the instructions have been given. By enclosing sequence numbers in the synchronization e-tokens, the later generated or resent synchronization e-tokens to be received by the server may compensate for a lost or late-received synchronization e-token.

In one aspect, the service point processor means further comprises a service point encryption key and is configured to decrypt user e-token(s) and/or generate encrypted synchronization e-token(s) encrypted with a service point encryption key associated with the service point of the comprised service point ID.

In one aspect, the service point is already hardcoded with the encryption key in the fabrication process or during installation.

A further effect of this embodiment may be that the encryption key is at no time sent as airborne data which may mitigate any risk of hacking the service point or the e-tokens. A further advantage is that in case one encryption key may be decoded, only a single service point may be affected.

In a further embodiment the service point is configured to connect with a wireless personal area network (WPAN) and communicate using the communication standard of the WPAN.

The user e-token adapted to be received by the service point using a WPAN network may be tagged with the service point ID to ensure selective communication only with devices comprising e-tokens with that service point ID to prevent unnecessary interference or unauthorized access to information.

The synchronization and acknowledgement e-tokens may not be tagged with a service point ID. These e-tokens may be transferred to and/or from a user application which is connected through the WPAN to the service point. Hence, a synchronization and/or acknowledgement e-token may only be transmitted to user applications which have gained access through a user e-token.

Thus, one effect of this embodiment is that selective access is ensured by limiting the access to the service point to holders of user e-tokens tagged with the service point's ID. This further promotes the robustness of the service point system.

Furthermore, the access may be exclusive, meaning that only one WPAN may be established at a time with each service point. This will ensure that only a single holder of a user e-token has access to the service point at a time.

Several service points may be located side by side, each with their own service point ID. An effect of such an embodiment may be that a large capacity may be comprised in one location with non-dependency—hence, a single holder of a user e-token does not occupy the entire capacity at the location. Furthermore, if one service point at the location is out of order, the other service points at that location may still be in operation.

The transmitted beacon signal and the transmission of the e-tokens between the service point and the user application may be a Bluetooth signal or signals of a similar communication standard with the same characteristics of low power consumption and a limited communication range may be used. Furthermore, the communication standard to be used may be widely used and implemented in mobile smart devices to achieve easy access to implement and use the method.

In line with the effects and advantages described for the method for allocating parcels, a further effect of the embodiment may be that the service point may communicate using low power consuming method as the transmitted signal may have a limited propagation distance.

Furthermore, the transmitted beacon signal comprising the service point ID may initiate that a user application carrying a user e-token tagged with a matching service point ID may establish a WPAN communication with the service point. This may be advantageous in regard to preventing unnecessary communication. A further advantage may be that the generated and transmitted synchronization e-token by the service point may be transmitted immediately to the user application. The user application may then transmit the synchronization e-token immediately or carry it until a proper communication connection to the server is established. Thus, the user application uses the mobile smart device for piggybacking the e-token from the service point to the server.

In a further embodiment of the service point, the service point processor means may be configured to create a service point synchronization record entry comprising the sequence number and the piece ID to a service point synchronization record.

One effect is that the service point synchronization record may comprise its own track history of performed instructions.

One advantage of this embodiment may be that the service point synchronization record may be used to derive the current status of the service point. This current status may be kept in a separate record in the service point—a service point status record.

In one aspect, the service point synchronization record may be further updated with received acknowledgement e-tokens. The receipt of an acknowledgement e-token may be referred to as establishing a handshake for successful communication of the synchronization e-token to the server. This update may therefore also be perceived as achieving synchronization of information between the server and the service point.

In one aspect, the service point synchronization record may only comprise the unacknowledged entries. Thus, when an acknowledgement e-token is received, a corresponding record entry may be deleted. Several copies of an acknowledgement e-token may be generated to ensure that at least one acknowledgement e-token reaches the service point. If the record entry has already been deleted, the acknowledgment e-token may be ignored. The service point may resend synchronization e-tokens with the unacknowledged entries of the service point synchronization record, until an acknowledgement e-token is received, to ensure the robustness of the system in case a synchronization e-token is lost.

Thereby, only a limited amount of information may be kept by the service point i.e. unacknowledged service point synchronization record entries and/or the current status of the service point.

A further effect of this embodiment may be that information comprised in a synchronization e-token, which is not acknowledged by the receipt of an acknowledgement e-token, is kept by the service point and may be resent until an acknowledgement may be received. Alternatively, in case several service point synchronization record entries are not acknowledged, these may be comprised in a single synchronization e-token.

In a further embodiment, the service point comprises a parcel locker, which parcel locker comprises a parcel locker chassis, one or more compartments, each compartment having at least one mechanical lockable door configured to be locked to the parcel locker chassis, which parcel locker comprises a battery and is configured to be battery operated.

The battery may also be a super capacitor, rechargeable batteries or comparable units.

In one aspect, the parcel locker may comprise a LI-ION battery pack of 7.2 V with a capacity of 19000 mAh. In test, this embodiment has proved a lifetime beyond 2 years, when receiving up to 18 user e-tokens a day with associated acts leading to opening a parcel locker door, generating a synchronization e-token and receiving an acknowledgement e-token. This is just one example of a suitable battery-pack to be applied, and the battery pack to be used is by no means limited to this example.

The battery may be replaceable or fixed. The lifetime of the batteries continues to increase and thus battery packs with a sufficient lifetime may be fixed in the parcel locker and last for the entire life time of the parcel locker. This may also be the case where rechargeable batteries are used, which are charged by renewable energy sources.

In one aspect, the parcel locker may comprise a sustainable enclosure as part of the chassis or outer frame. The material used for the parcel locker may be a metal, plastic material, fibre composite or comparable materials. The outer frame may comprise a combination of materials. The enclosure or outer frame may furthermore have an outer finish comprising weatherproof paint or other coating material. The hardware specification of the parcel locker may be two racks with individual doors and compartments of different sizes.

In one aspect, the electronics and batteries comprised in the parcel locker may be accessible in case of a failure.

In one aspect, means to access the individual compartments or other parts of the parcel locker in case of a failure should be provided.

In one aspect, the parcel locker may be mounted on a concrete base. In a further aspect, the parcel locker may be fitted with means for attaching it to the concrete base, where no screws are accessible from the outside, thereby avoiding any tampering with the parcel locker from the outside.

A further effect of this embodiment may be that the service point may be operated in areas or locations without a hardwired power supply. This may be advantageous in regard to operating the parcel locker in locations where there is no access to a stable power supply or any power supply at all. Furthermore, it may be advantageous that the operation is not affected by power failures such as power outage or power peaks.

The battery operated operation of the parcel locker may have the further effect of fast and easy installation, with no need for skilled persons such as electricians for installing the parcel locker.

A further effect of this embodiment may be that the service point may be operated as a self-service service point or, in other words, the parcel locker is an unstaffed service point with the advantage of reducing costs for service personal for operation of the service point. A further advantage of this embodiment may be that the service points can be distributed broadly and in remote areas to generate more pick-up places, and pick-up places which are widely scattered, compared to serviced postal offices.

The parcel lockers may be produced in different hardware configurations. The hardware configuration of the parcel locker means the configuration of the comprised compartments. The hardware configuration may be a combination of different sized compartments, a combination of equally sized compartments, a single compartment or the like. For example, a configuration could be a unit of nine compartments of mixed small, medium and large compartment sizes.

The hardware configuration and the number of parcel lockers may be adapted to each location to accommodate for the demand. The demand may reflect the size of parcels, the interval of deliveries, the time interval from delivery to pick-up, or other aspects.

The time interval from delivery to pick-up may for example be dependent on the character of the goods in the parcel. One example could be a parcel that comprises food or medicine to be kept in a given temperature interval, below or above a certain temperature, in which case the pick-up time interval may be limited to a number of hours from delivery, whereas the pick-up time for a delivery of non-temperature dependent items may be several days.

The parcel lockers may, to a certain extent, be used for distribution and allocations of parcels on an ad hoc basis, where the consignor and consignee do not have regular or large shipments, e.g. weekly or daily delivery of large shipments from company to company, so the demand in capacity of the parcel lockers may vary, depending on the time of year, festive seasons and the location. Such conditions may be part of the considerations when choosing hardware configuration and number of parcel lockers to be adapted to different locations.

In one aspect, the parcel locker may comprise a temperature sensor for measuring the surrounding temperature of the parcel locker, or measuring the temperature inside a single compartment or the temperature of a part of the parcel locker.

This may have the effect of assessing the temperature of the parcel over time. This may be advantageous in regard to estimating the time interval from delivery to pick-up, where the character of the goods in the parcel necessitates the parcel to be kept at a given temperature interval, below or above a certain temperature. This could be in the case of parcels comprising food, medicine, biological matter, chemical compounds or the like. The temperature may depend on the surrounding weather conditions, the temperature of the location of the parcel locker and whether it is packed in insolating materials, including cooler or heater bricks.

In one embodiment of the service point comprising a parcel locker, one or more compartments of the parcel locker may be reach-through compartments having two lockable doors.

The two lockable doors may be a front-end door and a back-end door, respectively.

Each of the front-end door and the back-end door may be provided with a mechanical lock to engage with the parcel locker chassis.

One effect of having compartments with front-end and back-end doors may be that the parcel locker can be loaded from a restricted access area e.g. using the back-end door and unloaded from a public access area using the front-end door. This may be advantageous in regard to pick-and-go services from a warehouse, pharmacies or similar facilities. In such cases the goods may be packed in storage areas with employee access only and arranged by an employee, being the consignor, in a compartment using the back-end door. The goods may subsequently be unloaded by a consignee from a public access area using the front-end door.

The employee may receive a user e-token which allows for accessing the compartment using the back-end door.

Associated synchronization and acknowledgement e-token may subsequently be generated, transmitted and received.

The consignor may subsequently receive a different user e-token which allows for accessing the compartment using the front-end door. Again, associated synchronization and acknowledgement e-token may subsequently be generated, transmitted and received.

Another advantage may be that the parcel locker may be built into a permanent wall separating two areas thereby improving the security of the consignor. This may be especially relevant for pharmacies.

In one embodiment of the service point comprising a parcel locker, each lockable door of the parcel locker may be selected from a group consisting of a sliding door, roll-up door, folding door, accordion door, gate and cabinet door.

Here, a door is considered a panel that makes an opening in a building, room or vehicle, i.e. the parcel locker. The door may be made of a hard, impermeable, and hard-to-break substance. The door is attached to a frame such that the door is moveable in respect to the frame. Doors make ingress into or egress from a building, room, or vehicle, i.e. the parcel locker, easier to manage. The door may be moved in various ways to allow or prevent ingress or egress. The door may be moved at angles away from the frame, by sliding on a plane parallel to the frame, by folding in angles on a parallel plane, or by spinning along an axis at the centre of the frame. Here the general purpose of the door is to provide access into and out of a space and preventing unwanted access from outsiders.

The door may have any size. The size may be a size generally referred to as port or gate sizes, typically measured in metres and/or decimetres, and down to sizes generally referred to as cabinet or locker door sizes, typically measured in decimetres and/or centimetres.

One effect of this embodiment may be to customize the parcel locker to the types and sizes of parcel being handled. In one case, the parcels may be of a size and/or weight requiring benefitting from an easy access at floor level. In another case, the parcels may be handled by fork lifts to reduce the workload of the consignor and/or the consignee and thus, the size of the doors should accommodate for that.

Alternatively, the parcel locker may be customized to the surrounding conditions existing at the location of the parcel locker. In one case the parcel locker may be exposed for a windy environment. In such case and in combination with large size compartments, a folding or sliding door may be advantageous instead of a hinged type solid door to reduce mechanical wear and tear.

In one aspect, the parcel locker doors when unlocked may be operated manually for a change in the open position of the door. Alternatively, the parcel locker door may be supplied with additional means for changing open position. Such additional means may be powered by other power sources e.g. central supply units, renewable energy sources or comparable power sources, these purely being examples and meant to be read as such.

An object of the invention may be achieved by a server configured with server processor means configured to create a piece ID for a parcel, allocate the parcel to a service point having a service point ID, and generate a user e-token tagged with the service point ID, the piece ID and instructions of a user event. The server further comprises server transmitter means configured to transmit the user e-token, and server receiver means configured to receive synchronization e-token(s) comprising a sequence number and a piece ID. The server is further configured to transmit an acknowledgment e-token, such that a handshake for a received synchronization e-token is performed, and where the server transmitter means and server receiver means are configured to communicate the e-tokens to and/or from a user application adapted to be installed on a mobile smart device comprising a processor and communication means.

As previously described, the method may provide for a distributed architecture for the parcel allocation, where the server allocates the parcels to one or more service points, and each service point returns information of when a user e-token has been used and with information to provide for the parcel locker status, such that the server is informed of the current status of the one or more service points. This embodiment of the server provides for a 'unit' to be used in such a distributed architecture, where the server acts as a main node collecting information from and communicating with the separate service point nodes, where a user event, such as a delivery or pick-up of a parcel, may be performed.

An effect of this embodiment is that the server from the received synchronization e-token comprising sequence number and piece ID may be updated with this information such that the server has continuously updated information of each service point. The updated service point status in combination with a piece ID of a parcel may entail that the server may allocate the parcel to the most suitable service point at that present time. The more present the status of the service points comprised by the server is, the more efficiently the service points' capacity may be used.

A suitable service point may be an appointed delivery point or a service point as close as possible thereto. A suitable service point may be a service point capable of storing the parcel for the time interval for pick-up (from receipt to pick-up) and under the right conditions. In case the service point comprises a parcel locker, the suitable service point may be a compartment big enough to comprise the parcel. The suitable service point may be a compartment which is available for the entire time interval for pick-up. The suitable service point may be a compartment which may store the parcel under the right conditions.

This may be advantageous in regard to allocating the parcel to an available service point, preferably the appointed service point, or if this is not vacant, to another service point under consideration of the appointed place of delivery. This may be advantageous both to the courier of the parcel, who may be sure that the parcel can be delivered at this service point, without having to make several delivery attempts, and for the recipient, who is directed to a service point as close to the appointed delivery place as possible, and with certainty, that the parcel can be delivered by the carrier and may be picked-up within the time interval for pick-up.

As previously described, an effect of the embodiment is that the user application uses the mobile smart device for piggybacking the e-tokens from the service point to the server. Especially, the use of piggybacking may result in the fact that a synchronization e-token to be communicated from the service point to the server via the user application may not reach the server at all, or may reach the server long after the synchronization e-token was generated.

However, by resending or generating synchronization e-tokens comprising multiple sequence numbers and piece IDs, the later received synchronization e-tokens may compensate for a lost or late-received synchronization e-token.

Thus, the advantage of using piggy-backing may be that several copies of synchronization e-tokens may be sent using different holders of user e-tokens tagged with the specific service points ID, thereby obtaining a robust information reception by the server, such that the server has reliable information of the one or more service points' current status. By sequentially numbering the instruction of the user events and sending acknowledgement e-tokens for handshaking, it may be ensured that all events are actually received by the server.

In one aspect, the server processor means further comprises an encryption key record comprising tabulated service point encryption key(s) and associated service point IDs. It may be further configured to decrypt synchronization e-tokens and generate user e-tokens encrypted with a service point encryption key associated with the service point of the comprised service point ID.

An effect of this embodiment may be that the user e-tokens and synchronization e-tokens are uniquely encrypted for each service point associated with the server. The encoding and decoding of the e-tokens may be performed by the server to any associated service point and, as previously mentioned the e-tokens associated with a single service point may be encoded and decoded by that service point. This may be advantageous in regard to obtaining encrypted e-tokens to be service point-specific, without transmitting any encryption keys between the units. It may lead to achieving a robust communication scheme with little risk of hacking. In case the encryption key is actually decoded, only one service point will be influenced.

In a further embodiment, the server is configured to communicate using a communication standard for a data transmission supporting mobile communication system.

One effect of this embodiment may be the use of commercially available mobile communication systems for transmitting the e-tokens. This may be advantageous both in regard to the robustness of the parcel allocation system and in regard to achieving a system with a high level of redundancy.

A further effect of the embodiment may be that the content of the e-tokens is not accessed outside the server or the service point, which may be advantageous both in regard to the robustness of the parcel allocation system and in regard to achieving a high level of security against hacking of the parcel allocation system, even when using a commercially available communication system.

In a further embodiment of the server, the server processor means may be configured to create a server synchronization record entry comprising the piece ID comprised in a received synchronization e-token to a server synchronization record.

One effect of this embodiment may be that the server is continuously updated on the status of each service points' capacity, thereby using the service points efficiently to achieve a high occupancy rate.

An object of the invention may be achieved by a user application configured to communicate e-tokens between a server and a service point adapted to be installed on a mobile smart device comprising a processor and communication means.

This embodiment may have the effects and advantages in line with those previously described in connection with the use of a mobile smart device for carrying and transmitting—or piggybacking—the communicated data, including:

The service point may only need to communicate with a mobile smart device within a short distance, thereby enabling the use of a low power consuming data communication connection.

The communication between the service point and the user application may not require any internet connection at the service point location, thereby avoiding adding any extra power load to the mobile smart device with the installed user application when picking up the parcel. A more power consuming communication with the server may be performed at a later time.

The user application only sends the e-token to an associated service point and only piggybacks small amounts of encrypted data from the service point to the server.

The recipient may use the user application installed on a mobile smart device for picking up the parcel and thus, the recipient of the parcel already has the user application activated when picking up the parcel, and the piggybacking of one or more e-tokens back to the server may not include any further actions from the recipient. Furthermore, the e-tokens may be passive and/or encrypted data, and therefore do not add any further risk to the users mobile smart device.

The use of piggybacking may result in that a synchronization e-token to be communicated from the service point to the server via the user application may not reach the server at all or may reach the server long after the event has been performed. But this may be accounted for by transmitting several e-tokens comprising overlapping information, or by transmitting the same e-token to multiple user applications.

In one aspect, the user application may be configured to perform a further act of displaying information adapted to be displayed on a screen connected to or part of a mobile smart device comprising a processor and transmitter/receiver means.

A further effect of this embodiment may be that any displaying of information may be performed by an external screen included in or connected to the mobile smart device, such that the method may display information but without requiring a service point with a display unit for performing the method. This may be advantageous in regard to omitting any costs for installing and maintaining such a display unit but also in regard to achieving a method wherein the method acts performed by the service point(s) may be kept at a minimum of power consumption.

Furthermore, this embodiment may have the effect that the service point may enable units typically used today for picking up parcels, such as a display and an input unit, which may be a key pad, a scanner or a touch screen, to display information and/or guide the user of the delivery or pick-up event, which often includes entering a code for the delivery or pick-up event.

An object of the invention may be achieved by a parcel allocation system comprising one or more service points, a server, and one or more user applications, where the parcel allocation system is being adapted for executing the acts of the method for allocating parcels.

The parcel allocation system may provide for a distributed architecture for the parcel allocation, where the server allocates the parcels to one or more service points, and each service point returns information when a user e-token has been used and with sufficient information to provide for the parcel locker status, such that the server may be informed of the current status of the one or more service points. This information may include instructions of a user event, such as a delivery or pick-up of a parcel to be performed by the holder of the user e-token.

Thus, one effect may be obtaining a system where the server is updated with information of the associated service points' status using low power consuming service points and service points without an internet or mobile communication connection. A further effect may be that the communicated data is encrypted.

In accordance with the previously described embodiments of the method, the information of the encryption keys is not shared between the single units comprised in the system, thereby mitigating the risk of hacking the information. In the case of one decoded encryption key, the damage may be limited to a single service point.

The further effects of the parcel allocation system may include one or more of the benefits previously described for the method, devices and/or user application, such as reduced processor power units and using common communication standards and off-the-shelf communication means.

In one exemplary embodiment of the method, the acts may be carried out in such a way that the server receives information of a parcel to be delivered at a given service point with service point ID. The server then allocates the parcel to the service point, and generates a user e-token, which is sent to the consignee of the parcel. The consignee receives the e-token and hence, is the holder of the user e-token. To use the e-token, the holder may use the user application on a mobile smart device holding the e-token to pick up the parcel. The e-token comprises information of the service point location, for example by use of the service point ID. The consignee then goes to the service point; here the user application and service point may connect by matching the service point in the beacon signal and the tagged service point of the user e-token. The service point may then receive the user e-token and the holder of the e-token may perform the instructions of the user event comprised in the user e-token.

After receiving the user e-token, a sequence number may be generated by the service point and the service point generates a synchronization e-token to be transmitted to the user application This synchronization e-token is later transmitted to the server from the user application. In reply to the received synchronization e-token, an acknowledgement e-token is generated by the server and transmitted to the service point, using a user application to establish a handshake for the receipt of the synchronization e-token.

This disclosure can advantageously be combined with one or more of the following six disclosures. Furthermore, the following six disclosures can be combined with each other.

A first disclosure may be a computer-implemented method for allocation of parcels to one or more service points comprising acts of receiving electronic tokens using a first communication standard, and transmitting electronic tokens, using a second communication standard enabling a communication direction. A method wherein the first communication standard is a communication standard of a data transmission supporting mobile communication system, and the second communication standard is a communication standard of a wireless personal area network in a communication direction being a service point communication direction, and the first communication standard is a communication standard of a wireless personal area network, and the second communication standard is a communication standard of a data transmission supporting mobile communication system in a communication direction being a server communication direction.

A second disclosure may be a method for operating a door having a mechanical lock of a parcel locker compartment, comprised in a parcel locker having a service point ID. The method comprises the acts of transmitting beacon signals, comprising the service point ID and receiving a user electronic token tagged with a matching service point ID, comprising a piece ID and instruction of a user event. The method further comprises the acts of creating a parcel locker command for the received instructions and transmitting a parcel locker command signal for the parcel locker command for operating a lock. A method wherein the user electronic token is received using a communication standard of a wireless personal area network.

A third disclosure may be a computer-implemented method for operating a distributed network of service points having a service point ID for allocation of parcels. The method comprises acts of assigning parcel locker(s) to the distributed service point network, each parcel locker being a service point, comprising one or more compartments and a service point ID, assigning user(s) to the distributed service point network and using piece IDs for each parcel being allocated in the distributed service point network. The method further comprises an act of communicating electronic tokens to a service point, wherein the electronic tokens are communicated via a user application to the service point, using a communication standard of a data transmission supporting mobile communication system for communicating the electronic tokens to/from the user application and a communication standard of a wireless personal area network (WPAN) for communicating the electronic tokens between the user application and the service point, such that the user application acts as a signal transformer for the communication of the electronic tokens.

A fourth disclosure may be a computer-implemented method for operating a system for allocation of parcels to one or more service points. The computer-implemented method may comprise acts of receiving electronic tokens using one communication standard, and transmitting electronic tokens using another communication standard. The method may further comprise an act of enabling a communication direction. The communication standards may be a communication standard of a data transmission supporting mobile communication system and a communication standard of a wireless personal area network.

One communication direction may be a service point communication direction, where the electronic tokens may be received using the communication standard of a data transmission supporting mobile communication system and transmitted using the communication standard of a wireless personal area network. Another communication direction may be a server communication direction, where the electronic tokens may be received using the communication standard of a wireless personal area network and transmitted using the communication standard of a data transmission supporting mobile communication system.

The electronic tokens may include user electronic tokens, synchronization electronic tokens and/or acknowledgement electronic tokens. The receiver and transmitter of a user electronic token may be a singled out node communicating in a service point communication direction. The receiver and transmitter of a synchronization electronic token may be any one of multiple distributed nodes communicating in a server communication direction. The receiver and transmitter of an acknowledgement electronic token may be any one of multiple distributed nodes communicating in a service point communication direction.

A fifth disclosure may be a method for operating a door having a mechanical lock of a parcel locker compartment, comprised in a parcel locker having a service point ID. The method may comprise the acts of transmitting beacon signals, comprising the service point ID and receiving a user electronic token tagged with a matching service point ID, comprising a piece ID and instruction of a user event. The method may further comprise the acts of creating a parcel locker command for the received instructions and transmitting a parcel locker command signal for the parcel locker command for operating a lock. A method wherein the user electronic token may be received using a communication standard of a wireless personal area network. The method may comprise further acts of generating a sequence number for the instruction of the user event, generating a synchronization electronic token, comprising the sequence number and the piece ID, transmitting the synchronization electronic token and receiving an acknowledgment electronic token.

A sixth disclosure may be a computer-implemented method for operating a distributed network of service points having a service point ID for allocation of parcels. The method comprises acts of assigning parcel locker(s) to the distributed service point network, each parcel locker being a service point, comprising one or more compartments and a service point ID, assigning user(s) to the distributed service point network and using piece IDs for each parcel being allocated in the distributed service point network. The method further comprises an act of communicating electronic tokens to a service point, wherein the electronic tokens are communicated via a user application to the service point, using a communication standard of a data transmission supporting mobile communication system for communicating the electronic tokens to/from the user application and a communication standard of a wireless personal area network (WPAN) for communicating the electronic tokens between the user application and the service point, such that the user application acts as a signal transformer for the communication of the electronic tokens. The electronic tokens may include user electronic tokens, synchronization electronic tokens and/or acknowledgement electronic tokens. Each of the user electronic tokens may be transmitted to the service point via a single user application. Each of the synchronization electronic tokens received from the service point and/or each of the acknowledgement electronic tokens transmitted to the service point may be communicated by one or more user applications in a distributed network of user applications.

| Detailed Description of the Invention | |
|---|---|
| 10 | Electronic tokens |
| 20 | Service point |
| 22 | Beacon signals |
| 24 | Service point ID |
| 30 | Server |
| 40 | Parcel |
| 42 | Piece ID |
| 50 | User electronic token |
| 52 | Instructions |
| 54 | User event |
| 58 | Sequence number |
| 60 | Synchronization electronic token |
| 70 | Acknowledgement electronic token |
| 80 | Communicated data |
| 90 | User application |

| Detailed Description of the Invention | |
|---|---|
| 92 | Mobile smart device |
| 94 | Processor (mobile smart device) |
| 96 | Communication means (mobile smart device) |
| 100 | Method |
| 102 | Transmitting (service point) |
| 104 | Receiving (service point) |
| 106 | Recording (service point) |
| 108 | Generating (service point) |
| 110 | Creating (Service point) |
| 112 | Displaying |
| 114 | Updating (service point) |
| 122 | Transmitting (server) |
| 124 | Receiving (server) |
| 128 | Generating (server) |
| 140 | Allocating |
| 130 | Creating (server) |
| 132 | Updating (server) |
| 150 | Communicating |
| 160 | Connect |
| 200 | Parcel locker |
| 202 | Service point transmitter means |
| 204 | Service point receiver means |
| 206 | Service point processor means |
| 210 | Parcel locker chassis |
| 212 | Compartments |
| 214 | Lockable door |
| 214B | Back-end door |
| 216 | Battery |
| 220 | Compartment number |
| 222 | Compartment status |
| 230 | Service point status record |
| 232 | Service point status record entry |
| 240 | Service point synchronization record |
| 242 | Service point synchronization record entry |
| 260 | Service point command |
| 262 | Service point command signal |
| 302 | Server transmitter means |
| 304 | Server receiver means |
| 306 | Server processor means |
| 330 | Server synchronization record |
| 332 | Server synchronization record entry |
| 400 | Parcel allocation system |
| 410 | First communication standard |
| 412 | Second communication standard |
| 414 | Wireless personal area network |
| 416 | Mobile communication standard |
| 420 | Signal transformer |
| 500 | Use |

Figure 1:
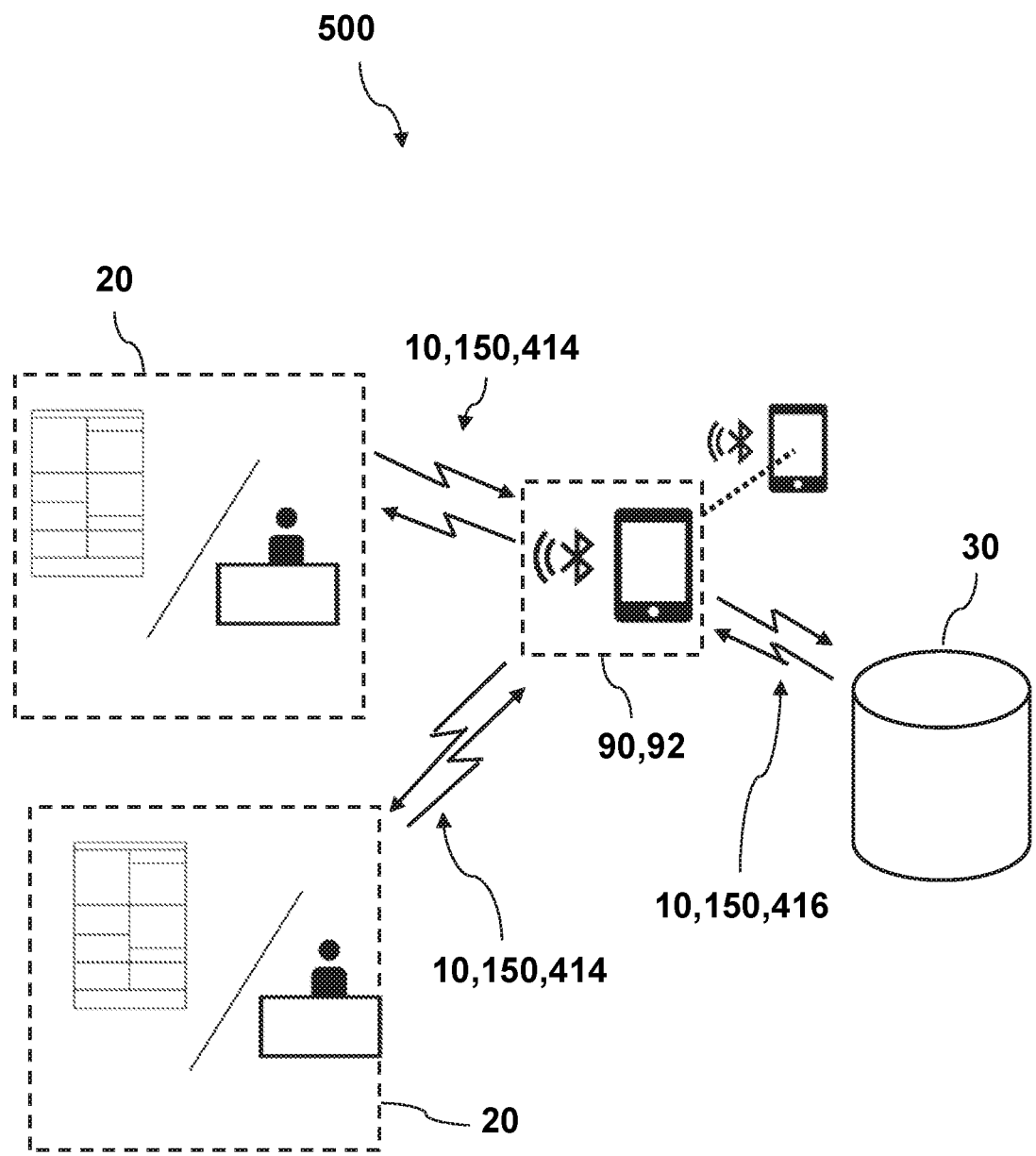
FIG. 1 illustrates one embodiment of a mobile smart device used in a parcel allocation system.

FIG. 1 illustrates an embodiment for the use of a mobile smart device 92 installed with a user application 90 for a parcel allocation system. The parcel allocation system comprises a server 30 and one or more service points 20. The mobile smart device 92 is used for transmitting e-tokens 10 between the server 30 and a service point 20. The e-tokens 10 are communicated 150 to the server 30 using a communication standard for a data transmission supporting mobile communication system 416.

The electronic tokens 10 are communicated 150 to the service point 20, using a communication standard of a wireless personal area network 414.

The user application 90 piggybacks the e-tokens 10 between the server 30 and the service points 20, and acts as a signal transformer for the e-tokens in the transmission between the server and the service point. The content of the e-tokens may not be changed in the transmission between the server and the service point.

Alternatively, a distributed network of mobile smart devices 92 installed with the user application 90 is used. The distributed network of mobile smart devices 92 is illustrated by the two mobile smart devices 92 and the dotted line in between.

Figure 2:
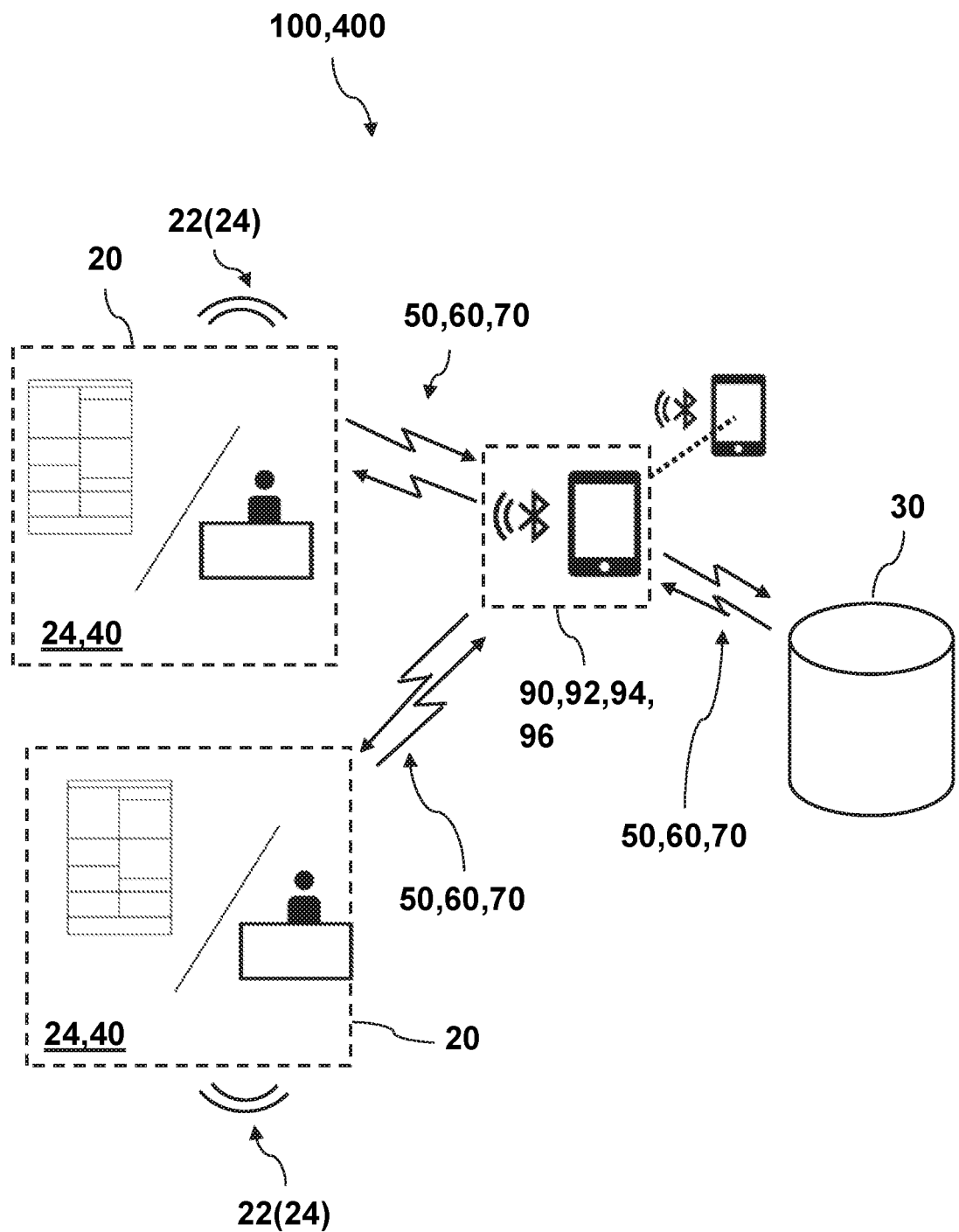
FIG. 2 illustrates an overview of the method for allocating parcels and the parcel allocation system.

FIG. 2 illustrates an overview of the method 100 for allocating parcels 40 and the parcel allocation system 400. The illustrated parcel allocation system 400 comprises two service points 20, a user application 90 adapted to be installed on a mobile smart device 92 and a server 30. The mobile smart device comprises a processor 94 and communication means 96. The parcel allocation system 400 is adapted for executing the acts of the method 100 for allocating parcels, which comprises acts of communicating data to and from the server 30 and the service points 20. The communicated data to or from the service points 20 and/or the server 30 is received by and/or transmitted from a user application 90, adapted to be installed on a mobile smart device 92. The communicated data may be encrypted with a service point encryption key associated with a single service point. The service points emit beacon signals 22 advertising of its presence and its service point ID 24. These beacon signals may be read by the user application 90.

As illustrated by the two mobile smart devices 92 and the dotted line in between, the method may be performed in a parcel allocation system using a distributed network of mobile smart devices 92 installed with the user application 90.

The communicated data may be comprised in electronic tokens, including user electronic tokens 50, synchronization electronic tokens 60 and/or acknowledgement electronic tokens 70. For each user electronic token 50, multiple synchronization electronic tokens 60 and/or acknowledgement electronic tokens 70 may be piggybacked by one or more user applications 90 of the distributed network of mobile smart device 92.

Figure 3:
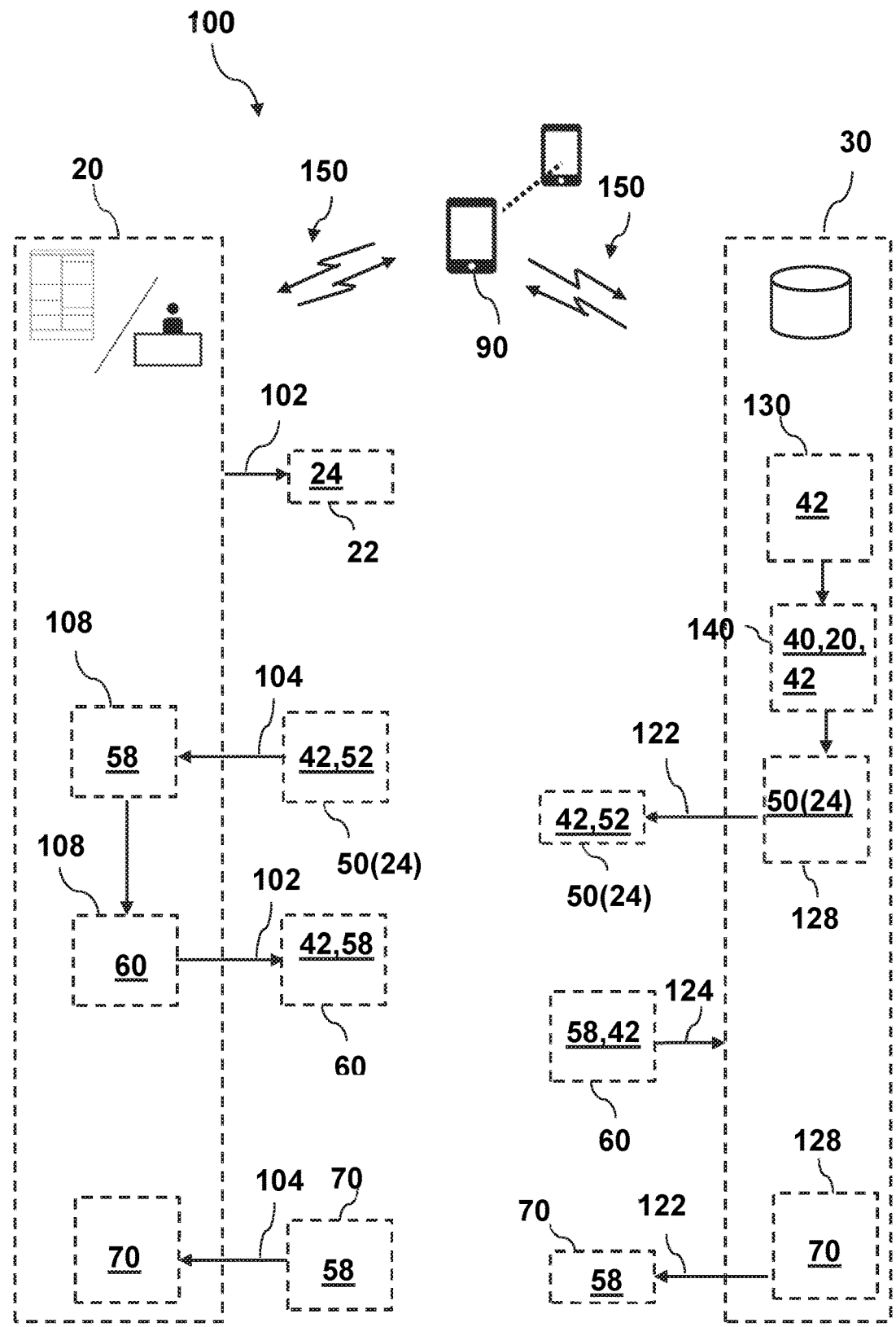
FIG. 3 illustrates one embodiment of the method for allocating parcels.

FIG. 3 illustrates one embodiment of the method 100 for allocating parcels. The method 100 comprises acts performed in one or more service point(s) 20 and acts performed in a server 30. In the illustrated embodiment, only a single service point 20 is illustrated, however, multiple service points may be used, each performing the acts of the method performed in the illustrated service point 20.

The acts performed in the service point 20 comprise transmitting 102 beacon signals 22, which may be transmitted on a regular frequency. The beacon signals 22 comprise the service point ID 24. A further act performed by the service point is receiving 104 one or more user e-tokens 50. Each user e-token 50 is tagged with the service point ID 24 and comprises instructions 52 of a user event to be performed and a piece ID 42. After receipt of the user e-token 50, a sequence number 58 is generated 108. In response hereto, a synchronization e-token 60 is generated comprising the piece ID 42 and the sequence number 58. The generated synchronization e-token 60 is then transmitted from the service point 20. The sequence number 58 may be a local identifier connected with a single piece ID. Alternatively, the sequence number 58 may be a local identifier connected with a single service point.

In the server 30, a piece ID 42 is created 130. The piece ID is an identification code within the parcel locker system for a parcel. The piece ID may be associated to further data about the parcel received by the server, comprising information of the dimension of the parcel, weight of the parcel, time interval for pick-up, address of the recipient, preferred pick-up location, name of the retailer sending the parcel and/or other information. After creation of the piece ID 42, the parcel 40 is allocated 130 to a service point 20 having a service point ID 24. The service point may be appointed in regard to any received parcel data. After allocating 140 the parcel 40 to a service point, a user e-token 50 is generated 128 by the server 30. The user e-token 50 is tagged with the allocated service points' 20 service point ID 24 and comprises the piece ID 42 and instructions 52 of a user event, to be performed at the allocated service point 20 by the holder of the user e-token 50. The generated 128 user e-token 50 is then transmitted 122 from the server 30. A further act of receiving 124 one or more synchronization e-tokens 60 is performed. Each synchronization e-token 60 may comprise one or more sequence numbers 58 and associated piece IDs 42.

For verification of the received synchronization e-token 60 an acknowledgement e-token 70 may be generated 128 and transmitted 122 by the server. The acknowledgement e-token may comprise the sequence number 58.

Alternatively, the acknowledgment e-token 70 may comprise another or several values identifying or being associated with the parcel e.g. the piece ID 42.

The service point 20 may receive 104 an acknowledgement e-token 70 comprising a sequence number 58, previously generated and transmitted by the service point, comprised in a synchronization e-token 60. The receipt of the acknowledgement e-token 70 acts as a handshake between the server and the service point as a successful communication completed of the information to be exchanged between these two units.

Figure 4:
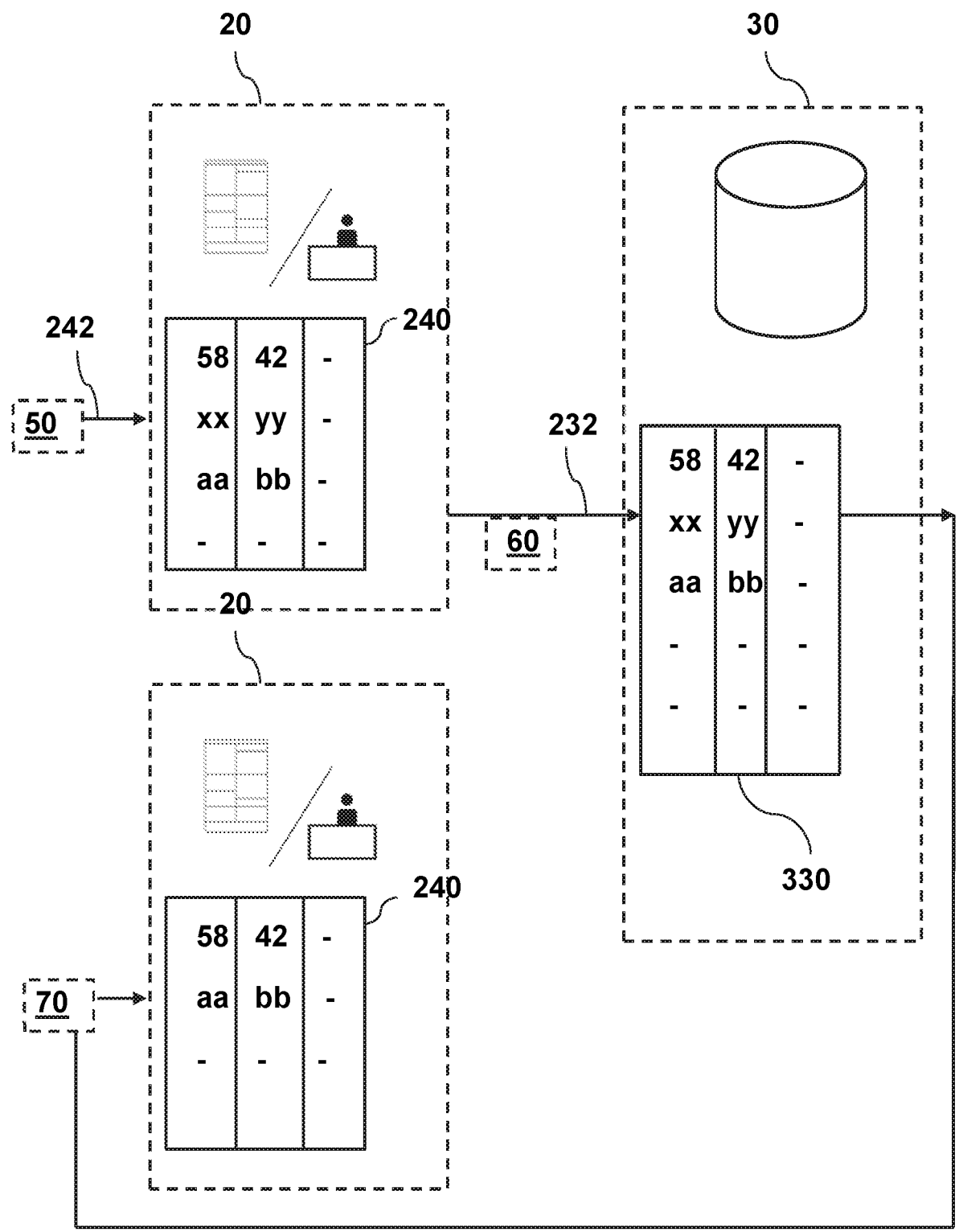
FIG. 4 illustrates one embodiment of synchronization of the server and a service point.

FIG. 4 illustrates one embodiment of how the synchronization of information between the server and a service point may be performed. In the illustrated embodiment, the service point 20 comprises a service point synchronization record 240, which may be updated with a service point synchronization record entry 242 comprising the sequence number 58 and the piece ID 42 based on the receipt of a user e-token 50.

In the illustrated embodiment, the server 30 comprises a server synchronization record 330, which may be updated with a server synchronization record entry 232, comprising the sequence number 58 and the piece ID 42 based on the receipt of a synchronization e-token 60.

In the illustrated embodiment, a user e-token 50 comprising the following values is received by the service point 20: Sequence number 58=xx and the piece ID 42=yy.

An associated synchronization e-token 60 comprising the following values is received by the server: Sequence number 58=xx and the piece ID 42=yy.

Further information may be included in the synchronization e-token and in the record entries.

The service point and the server now comprise synchronized information, and an updated service point status may be available in both units. However, a further acknowledgement e-token may be generated and transmitted by the server to send an acknowledgement to the service point 20 of receipt of the synchronization e-token 60. The acknowledgement e-token 70 may be tagged with the service point ID and comprise the sequence number of the acknowledged synchronization e-token 60. This may be referred to as a handshake between the units and upon receipt of the acknowledgement e-token 70 by the service point 20, the service point may now delete this service point synchronization record entry 242 from the service point synchronization record 240.

This embodiment may provide for a service point synchronization record 240 only comprising the non-acknowledged entries 242. This may further provide for resending synchronization e-tokens 60 with information associated to these non-acknowledged entries 242 or even generating synchronization e-tokens 60 comprising multiple non-acknowledged entries 242.

In a further example, the server may comprise a server status record in addition to the server synchronization record. And the service point may comprise a service point status record, in addition to the service point synchronization record. In this example, the service point comprises a parcel locker with six compartments.

The service point synchronization record may read:

| Sequence no. | Piece ID | instruction |
|---|---|---|
| 17 | 2354 | Delivery |
| 21 | 5901 | Pick-up |
| 23 | 34221 | Delivery |

The service point synchronization record may only comprise unacknowledged entries. Hence, when an acknowledgement e-token is received, a corresponding record entry may be deleted.

As long as the service point synchronization record holds any entries, there are unacknowledged synchronization e-tokens. This may cause for resending these synchronization e-tokens either as single e-tokens or collected in one e-token.

Several copies of an acknowledgement e-token may be generated to ensure that at least one acknowledgement e-token reaches the service point. If the record entry has already been deleted, the acknowledgment e-token may be ignored.

The service point status record [Example: 6 compartments, service point 30] may read (Ack. is abbreviation for acknowledgement):

| Compartment no. | Piece ID | Compartment status | Ack. |
|---|---|---|---|
| 1 | 2354 | 1 | 0 |
| 2 | 34221 | 1 | 0 |
| 4 | 5647 | 1 | 1 |

The service point status record shows that the three entries in the service point synchronization record are not acknowledged yet (compartment 1 and 2).

The user e-token, concerning piece ID=235 received by the service point, was a delivery e-token. The parcel has been delivered to compartment 1, which now is updated in the status record to a value=1 for occupied. The Ack. value reads 0, as the service point has not received an acknowledgment e-token yet.

The user e-token, concerning piece ID=34221 received by the service point, was a delivery e-token. The parcel has been delivered to compartment 2, which now is updated in the status record to a value=1 for occupied. The Ack. value reads 0, as the service point has not received an acknowledgment e-token yet.

The user e-token, concerning piece ID=5647 received by the service point, was a delivery e-token. The parcel has been delivered to compartment 4, which now is updated in the status record to a value=1 for occupied. The Ack. value reads 1, as the service point has received an acknowledgment e-token. The entry concerning piece ID=5647 is deleted from the service point synchronization record and therefore does not appear in that record.

The user e-token, concerning piece ID=5901 received by the service point, was a pick-up e-token. The parcel has been picked up from compartment 6, which may now be updated in the status record to a value=0 for available. It still appears from the service point synchronization record as the acknowledgement e-token has not been received by the service point yet. Alternatively, the entry concerning piece ID=5901 could still appear in the service point status record until the acknowledgment e-token has been received.

The server synchronization record concerning the above service point may read:

| Sequence no. | Piece ID | instruction |
|---|---|---|
| 16 | 5901 | Delivery |
| 17 | 2354 | Delivery |
| 18 | 247 | Delivery |
| 19 | 6849 | Pick-up |
| 20 | 5647 | Delivery |
| 21 | 5901 | Pick-up |
| 22 | 247 | Pick-up |
| 23 | 34221 | delivery |

The server synchronization record may comprise the track history of the service point. Thus, from the record, information regarding Piece ID 5647 may appear, even though it has been deleted from the service point synchronization record. Also both the delivery and pick-up of piece ID 5901 may appear, even though it has been deleted from the service point status record. One piece ID may appear in several server point synchronization entries, as the parcel may concern two user events: it may be delivered by the holder of a delivery user e-token and later be picked up by a holder of a pick-up user e-token.

The server status record may comprise information from multiple service points and may read (Ack. is abbreviation for acknowledgement):

| Service point ID | Sequence no. | Piece ID | Compartment no. | Compartment status | Ack. |
|---|---|---|---|---|---|
| 30 | 17 | 2354 | 1 | 1 | 0 |
| 19 | 47 | 65002 | 10 | 1 | 1 |
| 84 | 4523 | 342 | 1 | 0 | 1 |
| 30 | 20 | 5647 | 4 | 1 | 1 |
| 30 | 21 | 5901 | 6 | 0 | 0 |
| 27 | 364 | 27 | 7 | 0 | 1 |
| 30 | 19 | 6849 | 5 | 0 | 1 |
| 1 | 19 | 56 | 6 | 0 | 1 |
| 4 | 692 | 56470 | 8 | 1 | 1 |
| 16 | 21 | 590 | 5 | 1 | 1 |
| 30 | 22 | 247 | 3 | 0 | 1 |
| 30 | 23 | 34221 | 2 | 1 | 0 |

The server status reads the status of service point 30 for all six compartments and shows a free compartment for the pick-up instructions and an occupied compartment for the delivery instructions. Furthermore, the sequence number 18 regarding piece ID 247 does not appear, as this concerns the delivery of the parcel and afterwards the parcel has been picked up, according to sequence number 22.

Alternatively, the compartment status may be indicated using instructions instead.

This is just one example of how the server and the service point may be synchronized and/or how they keep track of the service points' status. The synchronization scheme is by no means limited to this example.

Figure 5:
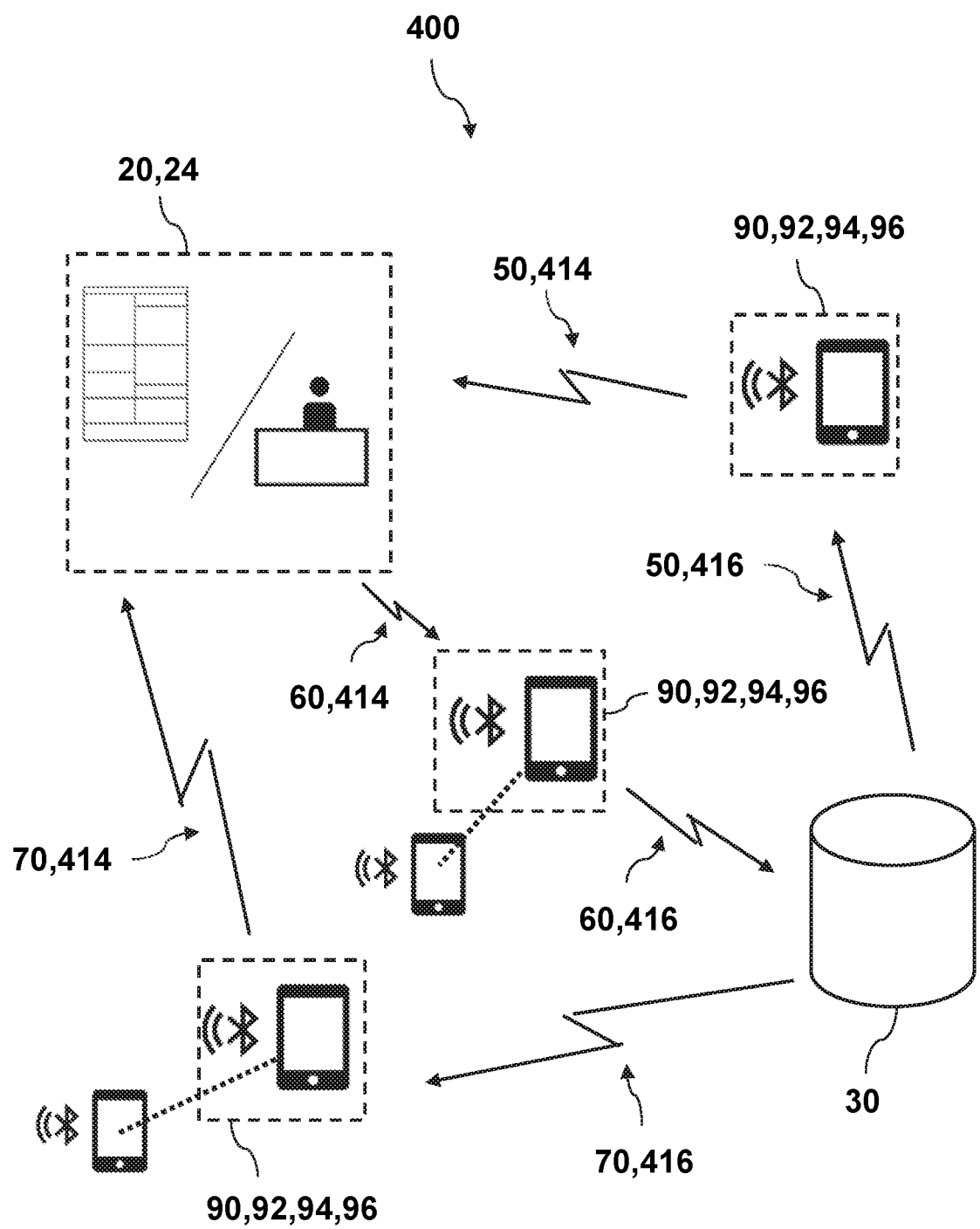
FIG. 5 illustrates one embodiment of the parcel allocation system.

FIG. 5 illustrates one embodiment of the communication of the e-tokens in the parcel locker system 400.

The user e-token 50 is transmitted from the server 30 to the service point 20 via a mobile smart device 92. The synchronization e-token 60 is transmitted from the service point 20 to the server 30 via a mobile smart device 92. The acknowledgement e-token 70 is transmitted from the server 30 to the service point 20 via a mobile smart device 92.

Both the user e-token 50 and the acknowledgement e-token 70 are transmitted from the server 30, using a communication standard for a data transmission supporting mobile communication system 416. Both the user e-token 50 and the acknowledgement e-token 70 are also carried by a mobile smart device 92 installed with the user application 90. The mobile smart device comprises processor means 94 and communication means 96. Again both the user e-token 50 and the acknowledgement e-token 70 are transmitted to the service point 20, using a communication standard of a wireless personal area network 414. The user e-token 50 and the acknowledgement e-token 70 are not carried at the same time and may be carried by different mobile smart devices 92.

The synchronization e-token 60 is transmitted from the service point 20 using a communication standard of a wireless personal area network 414. The synchronization e-token 50 is carried by a mobile smart device 92 installed with the user application 90. The mobile smart device 92 comprises processor means 94 and communication means 96. The synchronization e-token 60 is transmitted to the server 30 using a communication standard for a data transmission supporting a mobile communication system 416.

The synchronization e-token 60 and the acknowledgement e-token 70 may be communicated by any mobile smart device 92 installed with the user application 90 in a distributed network of mobile smart devices 92 installed with the user application 90. The network of distributed mobile smart devices is illustrated with the dotted line between two mobile smart devices 92.

Figure 6:
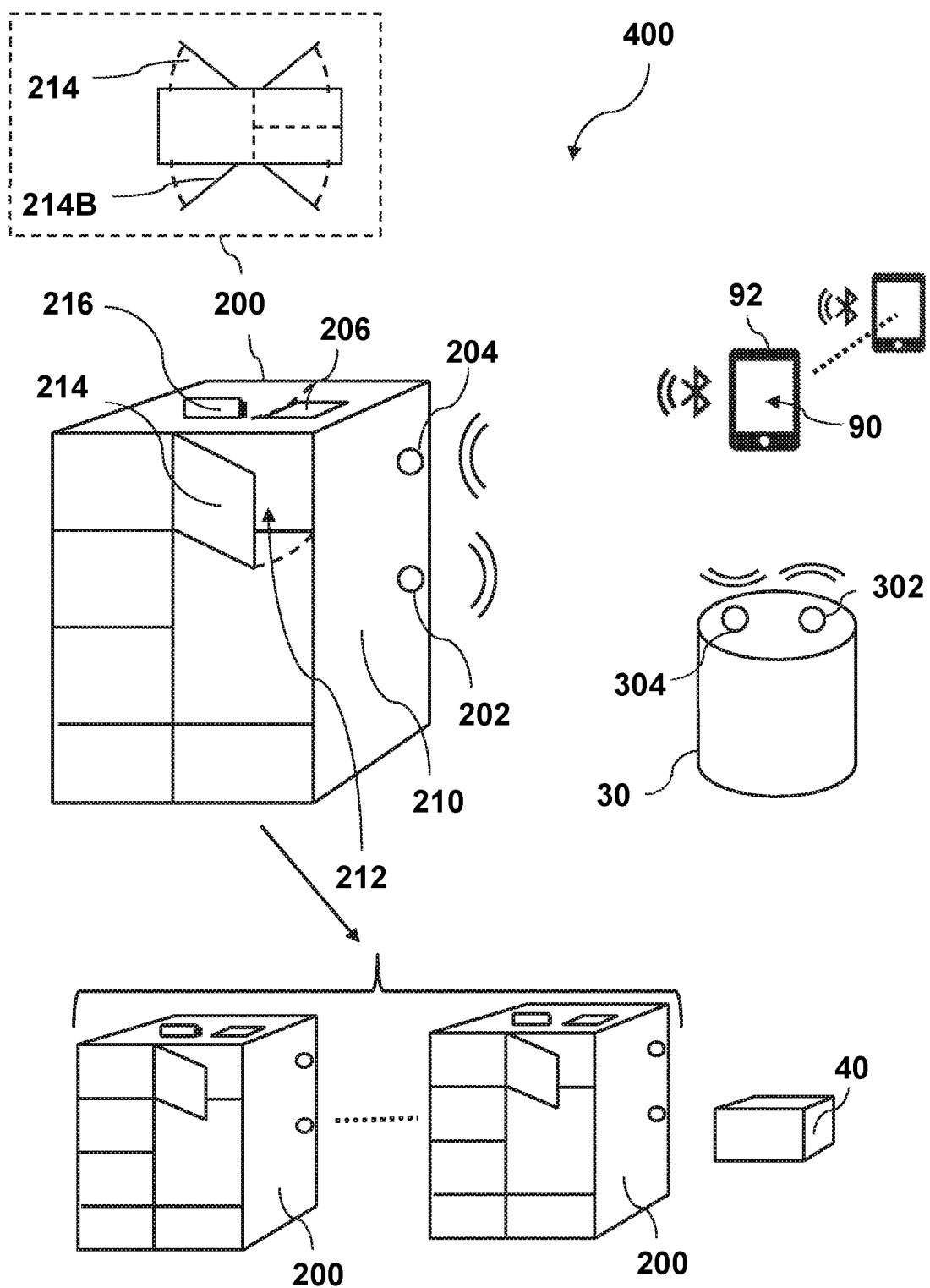
FIG. 6 illustrates another embodiment of a parcel allocation system.

FIG. 6 illustrates one embodiment of the parcel allocation system 400. The illustrated embodiment of a parcel allocation system comprises one or more parcel lockers 200 as a service point. The parcel allocation system may comprise several parcel lockers 200 as illustrated by the sign {. The parcel allocation system further comprises a server 30, and one or more user applications 90. The parcel allocation system is adapted for executing the acts of the method for allocating parcels 40.

The illustrated embodiment comprises one or more parcel lockers 200. The parcel locker 200 comprises a parcel locker chassis 210, one or more compartments 212, each compartment having at least one mechanical lockable door 214 configured to be locked to the parcel locker chassis 210. The parcel locker further comprises a battery 216 such that the parcel locker may be battery operated. The parcel locker further comprises service point transmitter means 202, service point receiver means 204 and service point processor means 206.

In the insert, an embodiment of the parcel locker 200 is illustrated from a top view. The parcel locker comprises multiple compartments 212, each compartment having at least one mechanical lockable door 214 configured to be locked to the parcel locker chassis. In the illustrated embodiment, the parcel locker 200 is designed with reach-through compartments 212 on the left-hand side of the parcel locker. In this embodiment the reach-through compartments have two doors, a front-end door 214 and a back-end door 214B accessing a single compartment 212 which facilitates front-end and back-end loading of the compartment. The reach-through compartment may in other embodiments only comprise a single door 214 and thus being front-end loaded. The parcel locker 200 is designed with half-through compartments 212 on the right hand side of the parcel locker. In this embodiment the half-through compartments have a single door accessing a single compartment 212 facilitating front-end loading of the compartment.

The illustrated embodiment comprises a server 30. The server 30 comprises server transmitter means 302, server receiver means 304 and server processor means 306. In one aspect, the server may further comprise an encryption key record which may comprise the service point IDs of the associated service points to the system and the associated service point encryption key.

The illustrated embodiment comprises one or more user applications 90 adapted to be installed on a mobile smart device 92 comprising transmitter/receiver means.

The invention claimed is:

1. A parcel allocation system comprising:
one or more service points, and
a server,
at least one of the one or more service points configured and arranged to:
transmit beacon signals including a service point ID,
receive a user electronic token tagged with the service point ID and including a piece ID and instructions of a user event, wherein the user electronic token is generated by the server and transmitted from the server to the service point via a user application, generating a sequence number for the instructions of the user event,
storing a track history of performed instructions at the at least one service point, said track history includes a service point synchronization record of unacknowledged entries of performed instructions, generating a synchronization electronic token including the service point synchronization record of unacknowledged entries of performed instructions, the synchronization electronic token including the sequence number and the piece ID, and
transmitting the synchronization electronic token to the server via at least one user application, the server is further configured and arranged to:
generate an acknowledgment electronic token for acknowledgment of the received synchronization electronic token including the track history of unacknowledged performed instructions; and
transmit the acknowledgment electronic token to the at least one service point via at least one user application; and
the at least one service point is further configured and arranged to receive the acknowledgment electronic token and update the track history of performed instructions with the information of the acknowledgment electronic token;
wherein the service point resends synchronization e-tokens with the unacknowledged entries of the service point synchronization record, until receiving at the service point an acknowledgement e-token acknowledging the unacknowledged entries.

2. The parcel allocation system of claim 1, wherein the server is configured and arranged to:
create a piece ID for a parcel,
allocate the parcel to a service point having a service point ID, and receiving synchronization electronic token(s) including a sequence number and a piece ID, wherein the service point ID and/or the piece ID are global unique identifiers.

3. The parcel allocation system of claim 2, wherein
the service point is configured and arranged to receive the acknowledgment electronic token wherein the sequence number is used as a handshake parameter between the server and the service point, and
wherein the user electronic token is communicated between the service point and the server via a user application and the synchronization electronic token and the acknowledgement electronic token are communicated by at least one user application, said user application adapted to be installed on a mobile smart device including a processor and communication means.

4. The parcel allocation system of claim 3, wherein the one or more user applications is configured to communicate electronic tokens between the server and the one or more service points, the one or more user applications configured and arranged to be installed on a mobile smart device including a processor and communication means; and
wherein the one or more service points each include
service point receiver means configured to receive a user electronic
token tagged with the service point ID and having a piece ID and instructions of a user event,
service point processor means configured to:
create a service point command for the received instructions and transmit the created command signal for performing the service point command,
generate a sequence number for the received instructions, and
generate a synchronization electronic token including the sequence number and the piece ID; and
a service point transmitter means configured to transmit beacon signals including the service point ID and to transmit generated synchronization electronic tokens;
wherein said service point receiver means are further configured to receive an acknowledgment electronic token, where the sequence number is used as a handshake parameter for a transmitted synchronization electronic token, and
wherein said service point transmitter means and service point receiver means are configured to communicate the electronic tokens to and/or from a user application adapted to be installed on a mobile smart device including a processor and communication means.

5. The parcel allocation system of claim 1, wherein the one or more service points each include
service point receiver means configured to receive a user electronic token tagged with the service point ID and having a piece ID and instructions of a user event,
service point processor means configured to:
create a service point command for the received instructions and transmit the created command signal for performing the service point command,
generate a sequence number for the received instructions, and
generate a synchronization electronic token including the sequence number and the piece ID; and
a service point transmitter means configured to transmit beacon signals including the service point ID and to transmit generated synchronization electronic tokens;
wherein said service point receiver means are further configured to receive an acknowledgment electronic token, where the sequence number is used as a handshake parameter for a transmitted synchronization electronic token, and
wherein said service point transmitter means and service point receiver means are configured to communicate the electronic tokens to and/or from a user application adapted to be installed on a mobile smart device including a processor and communication means, and
wherein each service point further informs the server of when a user token has been used and with sufficient information to provide for the service point status.

6. The parcel allocation system of claim 1, wherein the server includes
a server processor means configured to
create a piece ID for a parcel,
allocate the parcel to a service point having a service point ID, and
generate a user electronic token tagged with the service point ID, the piece
ID and instructions of a user event;
a server transmitter means configured to transmit the user electronic token; and
a server receiver means configured to receive synchronization electronic token(s) including a sequence number and a second piece ID;
wherein said server is further configured to transmit an acknowledgment electronic token, wherein the sequence number is used as a handshake parameter for a received synchronization electronic token, and where said server transmitter means and server receiver means are further configured to communicate the electronic tokens to and/or from a user application adapted to be installed on a mobile smart device including a processor and communication means.

7. The parcel allocation system according to claim 1, wherein the one or more user applications are configured to communicate electronic tokens between the server and the one or more service points,
wherein the user application is adapted to be installed on a mobile smart device including a processor and communication means;
wherein the user applications are configured to act as a signal transformer for the electronic tokens being piggybacked by the user application between the server and the one or more service points, said electronic tokens include user electronic tokens, synchronization electronic tokens including a sequence number and/or acknowledgement electronic tokens, and
wherein the sequence number is used as a handshake parameter.

8. A service point configured and arranged to:
transmit beacon signals including a service point ID,
receive a user electronic token tagged with the service point ID and including a piece ID and instructions of a user event, wherein the user electronic token is generated by a server and transmitted from the server to the service point via a user application,
generate a sequence number for the instructions of the user event,
store a track history of performed instructions at the service point, said track history includes unacknowledged performed instructions of the service point,
generate a synchronization electronic token including the track history of unacknowledged entries of performed instructions, the synchronization electronic token including the sequence number and the piece ID, and transmit the synchronization electronic token,
the at least one service point is further configured and arranged to
receive an acknowledgment electronic token transmitted from the server via at least one user application, the acknowledgment electronic token including the track history of unacknowledged performed instructions; and
update the track history of performed instructions with the information of the acknowledgment electronic token, wherein the service point resends synchronization e-tokens with the unacknowledged entries of the service point synchronization record, until an acknowledgement e-token is received acknowledging the unacknowledged entries.

\* \* \* \* \*